United States Patent
Kuroda et al.

(10) Patent No.: US 7,553,059 B2
(45) Date of Patent: Jun. 30, 2009

(54) OPTICAL SHEET, AND BACKLIGHT UNIT AND DISPLAY USING THE SAME

(75) Inventors: Kenjiro Kuroda, Tokyo (JP); Mitsuru Endo, Tokyo (JP); Natsuka Sakai, Tokyo (JP); Godai Fukunaga, Tokyo (JP); Tomohiro Nakagome, Tokyo (JP); Yoshiaki Shiina, Tokyo (JP); Luis Manuel Murillo-Mora, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 62 days.

(21) Appl. No.: 11/925,160

(22) Filed: Oct. 26, 2007

(65) Prior Publication Data
US 2008/0055929 A1 Mar. 6, 2008

Related U.S. Application Data

(63) Continuation of application No. 11/808,120, filed on Jun. 6, 2007, now Pat. No. 7,374,328, which is a continuation of application No. PCT/JP2006/301572, filed on Jan. 31, 2006.

(30) Foreign Application Priority Data
Jan. 31, 2005 (JP) ............................. 2005-022936

(51) Int. Cl.
*F21V 7/04* (2006.01)
(52) U.S. Cl. ................... 362/607; 362/606; 362/609; 362/624
(58) Field of Classification Search ......... 362/606–609, 362/622–624; 359/453, 454; 349/112
See application file for complete search history.

(56) References Cited

U.S. PATENT DOCUMENTS 6,527,410 B2    3/2003    Yamaguchi
6,822,707 B2    11/2004   Ariyoshi et al.

(Continued)

FOREIGN PATENT DOCUMENTS

JP          63-8603        1/1988

(Continued)

OTHER PUBLICATIONS

U.S. Appl. No. 11/808,120, filed Jun. 6, 2007, Kenjiro Kuroda, et al.

(Continued)

*Primary Examiner*—Ali Alavi

(57) ABSTRACT

In an optical sheet which is used for light control illumination in a backlight unit for a display, in order from an incident side of an illuminating light, there are provided at least a light scattering layer which scatters the illuminating light toward an outgoing surface side, an adhesion layer or an adhesive layer, a light reflection layer which reflects light scattered by the light scattering layer toward the light scattering layer side, and a lens sheet whose flat rear face is fixed to the other side of the light reflection layer, and in which a plurality of unit lenses are disposed on the surface. Opening portions corresponding to the respective unit lenses one-to-one are provided to the light reflection layer, and thickness of the adhesion layer or the adhesive layer is thinner than that of the light reflection layer.

97 Claims, 8 Drawing Sheets

U.S. PATENT DOCUMENTS

| | | | |
|---|---|---|---|
| 7,227,599 B2* | 6/2007 | Sonoda et al. | 349/95 |
| 7,356,239 B2* | 4/2008 | Hara et al. | 385/146 |
| 2001/0012078 A1* | 8/2001 | Hira et al. | 349/95 |
| 2001/0015780 A1 | 8/2001 | Yamaguchi | |
| 2001/0050811 A1* | 12/2001 | Miyata | 359/453 |
| 2005/0052737 A1* | 3/2005 | Amemiya et al. | 359/456 |
| 2006/0001974 A1 | 1/2006 | Uehara et al. | |
| 2007/0104911 A1* | 5/2007 | Chiang et al. | 428/40.1 |

FOREIGN PATENT DOCUMENTS

| | | |
|---|---|---|
| JP | 1-37801 | 8/1989 |
| JP | 3-127041 | 5/1991 |
| JP | 6-102506 | 4/1994 |
| JP | 7-20466 | 1/1995 |
| JP | 8-211205 | 8/1996 |
| JP | 10-39108 | 2/1998 |
| JP | 10-73808 | 3/1998 |
| JP | 10-506500 | 6/1998 |
| JP | 2000-171617 | 6/2000 |
| JP | 2000-284268 | 10/2000 |
| JP | 2001-305315 | 10/2001 |
| JP | 2003-75644 | 3/2003 |
| JP | 2004-85761 | 3/2004 |
| JP | 2005-148095 | 6/2005 |

OTHER PUBLICATIONS

Notification of Reason for Rejection issued on May 8, 2007 in Japanese Patent Application No. 2007-500652 (4 pages) related to the present above-identified US application, including an English language translation (7 pages).

International Preliminary Report on Patentability (Chapter I or Chapter II of the Patent Cooperation Treaty) including Written Option of the ISA, issued Aug. 9, 2007 in International Application No. PCT/JP2006/301572 from which the present above-identified US application claims priority (6 pages).

\* cited by examiner

| | Film 1 | Film 2 | Sample | Film 3 |
|---|---|---|---|---|
| Comparative structure 1 | Diffusion plate | Lower diffusion film 2 | BEF | DBEF |
| Example structure 1 | Diffusion plate | Lower diffusion film 2 | Example 1 | DBEF |
| Example structure 2 | Diffusion plate | Lower diffusion film 2 | Example 2 | DBEF |
| Example structure 3 | Diffusion plate | Lower diffusion film 2 | Example 3 | DBEF |
| Example structure 4 | Diffusion plate | Lower diffusion film 2 | Example 4 | DBEF |
| Example structure 5 | Diffusion plate | Lower diffusion film 2 | Example 5 | DBEF |
| Example structure 6 | Lower diffusion film 1 | — | Example 1 | DBEF |
| Example structure 7 | Lower diffusion film 1 | — | Example 2 | DBEF |
| Example structure 8 | Lower diffusion film 1 | — | Example 3 | DBEF |
| Example structure 9 | Lower diffusion film 1 | — | Example 4 | DBEF |
| Example structure 10 | Lower diffusion film 1 | — | Example 5 | DBEF |
| Example structure 11 | Diffusion plate | — | Example 1 | DBEF |
| Example structure 12 | Diffusion plate | — | Example 2 | DBEF |
| Example structure 13 | Diffusion plate | — | Example 3 | DBEF |
| Example structure 14 | Diffusion plate | — | Example 4 | DBEF |
| Example structure 15 | Diffusion plate | — | Example 5 | DBEF |
| Example structure 16 | Diffusion plate | — | Example 6 | DBEF |
| Example structure 17 | Diffusion plate | — | Example 7 | DBEF |
| Example structure 18 | Diffusion plate | — | Example 8 | DBEF |
| Example structure 19 | Diffusion plate | — | Example 9 | DBEF |

F I G. 12A

| | Film 1 | Film 2 | Sample | Film 3 |
|---|---|---|---|---|
| Comparative structure 2 | Diffusion plate | Lower diffusion film 2 | BEF | Upper diffusion film |
| Example structure 20 | Lower diffusion film 1 | — | Example 1 | Upper diffusion film |
| Example structure 21 | Lower diffusion film 1 | — | Example 2 | Upper diffusion film |
| Example structure 22 | Lower diffusion film 1 | — | Example 3 | Upper diffusion film |
| Example structure 23 | Lower diffusion film 1 | — | Example 4 | Upper diffusion film |
| Example structure 24 | Lower diffusion film 1 | — | Example 5 | Upper diffusion film |
| Example structure 25 | Diffusion plate | — | Example 1 | Upper diffusion film |
| Example structure 26 | Diffusion plate | — | Example 2 | Upper diffusion film |
| Example structure 27 | Diffusion plate | — | Example 3 | Upper diffusion film |
| Example structure 28 | Diffusion plate | — | Example 4 | Upper diffusion film |
| Example structure 29 | Diffusion plate | — | Example 5 | Upper diffusion film |
| Example structure 30 | Lower diffusion film 1 | — | Example 1 | — |
| Example structure 31 | Lower diffusion film 1 | — | Example 2 | — |
| Example structure 32 | Lower diffusion film 1 | — | Example 3 | — |
| Example structure 33 | Lower diffusion film 1 | — | Example 4 | — |
| Example structure 34 | Lower diffusion film 1 | — | Example 5 | — |

F I G. 12B

OPTICAL SHEET, AND BACKLIGHT UNIT AND DISPLAY USING THE SAME

CROSS-REFERENCE TO RELATED APPLICATIONS

This is application is a continuation of U.S. application Ser. No. 11/808,120 filed Jun. 6, 2007 now U.S. Pat. No. 7,374,328, which is a Continuation Application of PCT Application No. PCT/JP2006/301572, filed Jan. 31, 2006, which was published under PCT Article 21(2) in Japanese, the entire contents of all are incorporated herein by reference. This application is also based upon and claims foreign priority benefit from prior Japanese Patent Application No. 2005-022936, filed Jan. 31, 2005, the entire contents of which is incorporated herein by reference.

BACKGROUND OF THE INVENTION

1. Field of the Invention

The present invention relates to an improvement of an optical sheet used for controlling an illumination light path mainly in a backlight unit for a display which uses a liquid crystal display element, and in particular, to a backlight unit and a display which are equipped with the optical sheet.

2. Description of the Related Art

As displays which are typified by liquid crystal displays, the popularization of a type in which a light source required for recognizing presented information is built in has been remarkable. In a battery-powered device such as a laptop computer, the electric power consumed by the light source accounts for a considerable percentage of the electric power consumed in the entire battery-powered device.

Accordingly, the battery life is increased by reducing the total electric power required for providing a predetermined luminance. This is particularly favorable for a battery-powered device.

The Brightness Enhancement Film (BEF) which is a registered trademark of a U.S. company, 3M, has been broadly used as an optical sheet for solving this problem.

As shown in FIG. 1, the BEF is a film in which unit prisms 72 having a triangular-shaped cross section are arrayed periodically in one direction on a single component 70.

The unit prisms 72 have sizes (a pitch) which are larger than a wavelength of light.

The BEF condenses "off-axis" light and redirects it "on-axis" toward a viewer or recycles the light.

At the time of using the display (turn on), the BEF increases the on-axis luminance by reducing the off-axis luminance. The term "on-axis" here is a direction coincident with a visual direction of a viewer, and is generally along a normal line direction with respect to a display screen (the direction F shown in FIG. 1).

When the repeating array structure of the unit prisms 72 is a parallel structure in only one direction, it is possible to only redirect or recycle light in the parallel direction, and in order to carry out luminance control of a display light in horizontal and vertical directions, two sheets are used in combination so as to be superimposed on one another such that the parallel directions of the prism groups are substantially perpendicular to one another.

In accordance with such use of the BEF, it is possible for a display designer to achieve a desired on-axis luminance while reducing an electricity consumption.

As Patent Documents which disclose a technology of using a luminance control component having a repeating array structure of the unit prisms 72 typified by the BEF, for a display, there have been a number of Patent Documents, as shown by, for example, Jpn. Pat. Appln. KOKOKU Publication No. 1-37801, Jpn. Pat. Appln. KOKAI Publication Nos. 6-102506 and 10-506500.

In an optical sheet using the BEF as a luminance control component as described above, as shown in FIG. 2, it is possible to control so as to enhance a light intensity in the visual direction F of a viewer by emitting a light beam L from a light source 20 finally at a controlled angle φ by refraction x. However, at the same time, optic elements due to reflection/refraction Y are emitted wastefully in a cross direction without heading in the visual direction F of a viewer.

Accordingly, in a light intensity distribution emitted from the optical sheet using the BEF as shown in FIG. 1, as shown in the light intensity distribution B of FIG. 3, the light intensity in the visual direction F of the viewer, i.e., at an angle 0° with the visual direction F is enhanced to the maximum. However, as shown by small light intensity peaks in the vicinity of ±90 ° shown on the abscissa in the drawing, there is the problem that light emitted wastefully from cross directions is increased.

Further, when the above-described component 70 is used for a direct-type system backlight unit in which an optical waveguide structuring an edge-light type surface light source is not used, a structure in which a light diffusion layer (a single light diffusion plate or a combination with a light diffusion film) is placed between the light source 20 and the component 70 is commonly used. However, due that their surfaces are flat, when both components are in contact (the component 70 and the light diffusion layer (not shown)) such that there is not a definite boundary surface and if both are materials having a refractive index close to one another, the light incident on the unit prisms 72 is not incident at the intended angle, which makes it difficult to perform the optical characteristic as designed by the unit prisms 72.

In particular, in the case of using a structure in which the component 70 and the light diffusion layer are laminated to be integrated via an adhesive layer or an adhesion layer, generation of unexpected elements of incident light (or a reduction in functions due to the light diffusion layer) is easily brought about, which makes it further difficult to perform the optical characteristic as designed.

The present invention has been achieved in consideration of the circumstances, and an object of the present invention is to provide an optical sheet in which it is possible to emit light from a light source so as to be uniformed, and to control a diffusion range without increasing an amount thereof emitted wastefully.

Note that, in the present application, "diffusion" and "scattering" serving as an optical characteristic, "adhesion layer" and "adhesive layer", and "optical sheet" and "optical film" according to the present application are used as synonyms.

BRIEF SUMMARY OF THE INVENTION

In order to achieve the above-described object, in the present invention, the following measures are devised.

Namely, an optical sheet according to a first aspect of the present invention, which is used for light control illumination in a backlight unit for a display, has light reflection parts at non-light condensing areas by the lens unit, and light transmission parts at areas other than the light reflection parts, on the surface opposite to the lens unit of a lenticular sheet having lens units. The lenticular sheet having lens units is formed such that a convex cylindrical lens group is formed in parallel on one side.

The light reflection parts are formed by applying coating formation and transferring formation of an ink layer formed by dispersive mixing filler metal, or by laminating formation of metallic foil.

The light transmission parts need not be flat surfaces, and could be convex portions or concave portions formed on the surfaces. Alternatively, at least one of convex cylindrical lenses and concave cylindrical lenses may be formed on the light transmission parts.

Based on a distance TB measured from a valley portion of the concavity and convexity structuring the lens unit to the surface on the other side, a width A of the light transmission parts, a pitch P between the parallel convex cylindrical lenses, and a critical angle α at the interface of the lenticular sheet at the light transmission parts, a relation of $P \leq A+2*TB*\tan\alpha$ is formed.

Further, based on a height TL of the concavity and convexity structuring the lens unit, a distance TB from a valley portion of the concavity and convexity to the surface on the other side, a width A of the light transmission parts, and a pitch P between the parallel convex cylindrical lenses, relations of $0.3 < TL/P < 0.6$, $0.3 < TB/P < 1.0$, and $0.3 < A/P < 0.6$ are formed.

Further, the lenticular sheet is formed from a laminated structure in which the lens unit is formed on one surface of a sheet-like transparent base material, and at the boundary of unit lenses adjacent to one another, a tangent line at a valley portion of the adjacent unit lenses is within a range of 35 to 600.

On the other hand, the light reflection parts are, as one example, in a strip form having light transmission parts corresponding to the respective unit lenses which are convex cylindrical lenses one-to-one, and convex portions corresponding to the stripe form are formed on the surface opposite to the lens unit.

Further, an optical sheet according to a second aspect of the present invention, which is used for light control illumination in a backlight unit for a display, has, in order from an incident side of an illuminating light: a light scattering layer which scatters the illuminating light toward an outgoing surface side serving as a non-incident surface side; an adhesion layer or an adhesive layer; a light reflection layer which is made to adhere or stick to the light scattering layer by the adhesion layer or the adhesive layer, which has a surface with high light reflectivity so as to face the outgoing surface side of the light scattering layer, and which reflects light scattered by the light scattering layer toward the light scattering layer side; and a lens sheet whose flat rear face is fixed to the other side of the light reflection layer, and in which a plurality of unit lenses are disposed on a surface. The light scattering layer may be a diffusion sheet using a general base material typified by, for example, PET (polyethylene terephthalate), PC (polycarbonate), PMMA (polymethyl methacrylate), PP (polypropylene), PE (polyethylene), or may be a diffusion plate using a base material typified by PC, PMMA, acryl, PS (polystyrene). Then, opening portions respectively corresponding to the unit lenses one-to-one are provided to the light reflection layer, and a thickness of the adhesion layer or the adhesive layer is thinner than the light reflection layer.

Moreover, the lens sheet is a lenticular sheet having a lens unit formed such that semi-tubular convex cylindrical lenses are arranged as unit lenses in parallel in one direction. When parallel light beams are made incident onto the lenticular sheet from the lens unit side, by providing striped portions of light-transmitting openings serving as opening portions so as to include areas onto which the incident parallel light beams are condensed by the focusing action of the lens unit, non-opening portions are formed from a stripe-form light reflection layer, and a pitch between the semi-tubular parallel convex cylindrical lenses and a formation pitch of the stripe-form opening portions are made equal. The shapes of the unit lenses described as the semi-tubular convex cylindrical lenses may be of various types, such as spherical or aspherical, and as a height of the concavity and convexity of the lens unit, various designs may be used.

For example, the opening portions contacting the rear face of the lens sheet are air layers, or are formed from a material with a refractive index lower than that of the lens sheet. The adhesion layer or the adhesive layer is an ultraviolet curing resin layer, a pressure sensitive adhesive layer, a thermosensitive adhesion layer, or the like. Alternatively, this may be structured so as to include light diffusible fine particles. The light reflection layer is white ink, metallic foil, metallized layer, or the like.

Such a lens sheet is a monolithic compact obtained by press molding or extrusion molding using, for example, thermoplastic resin. Further, such a lens sheet has a laminated structure in which unit lenses formed from hardened material of radiation cured resin, or thermoplastic resin are formed so as to polymerizing-adhere onto the surface of the base material.

Moreover, there may be provided a light scattering layer formed from a sheet or a film having a light scattering characteristic, or a reflective polarization split film on the light outgoing surface side of such an optical sheet.

On the other hand, a third aspect of the present invention is a backlight unit for a display which is structured by providing such an optical sheet on the back face of an image display element specifying a display image, along with a light source. Here, as a light source, for example, a direct-type light source, a surface light source formed from an edge-light type light source and an optical waveguide, or the like is used.

Moreover, a fourth aspect of the present invention is a display in which such a backlight unit for a display is structured by combining an image display element formed from a liquid crystal display element specifying a display image in accordance with transmission/prevention of light-transmittance in units of pixels, and a light source formed from a cold-cathode tube or an LED.

BRIEF DESCRIPTION OF THE SEVERAL
VIEWS OF THE DRAWING

FIG. 12A is a table in which concrete structures of respective parts in the structure of the backlight for performance evaluation shown in FIG. 10 are listed.

FIG. 12B is a table in which concrete structures of respective parts in the structure of the backlight for performance evaluation shown in FIG. 10 are listed.

DETAILED DESCRIPTION OF THE INVENTION

Hereinafter, best modes for carrying out the present invention will be described with reference to the drawings.

Figure 1:
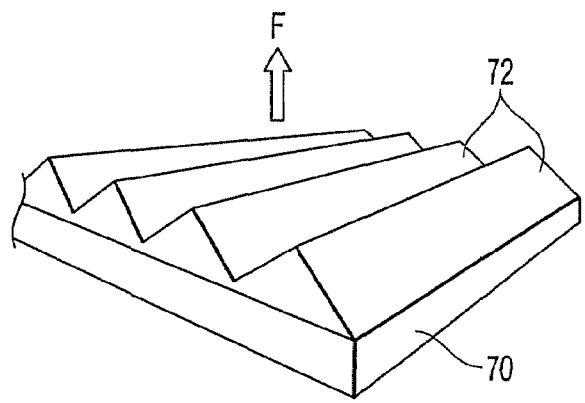
FIG. 1 is a perspective view showing a structural example of a BEF.
Figure 2:
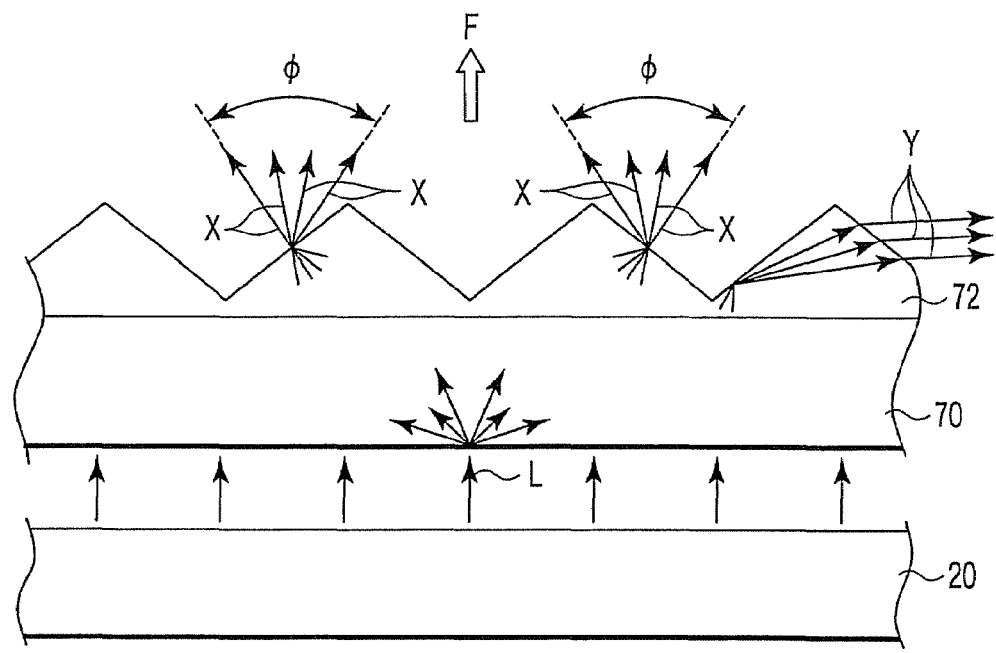
FIG. 2 is a diagram for explanation of an optical effect of the BEF.
Figure 3:
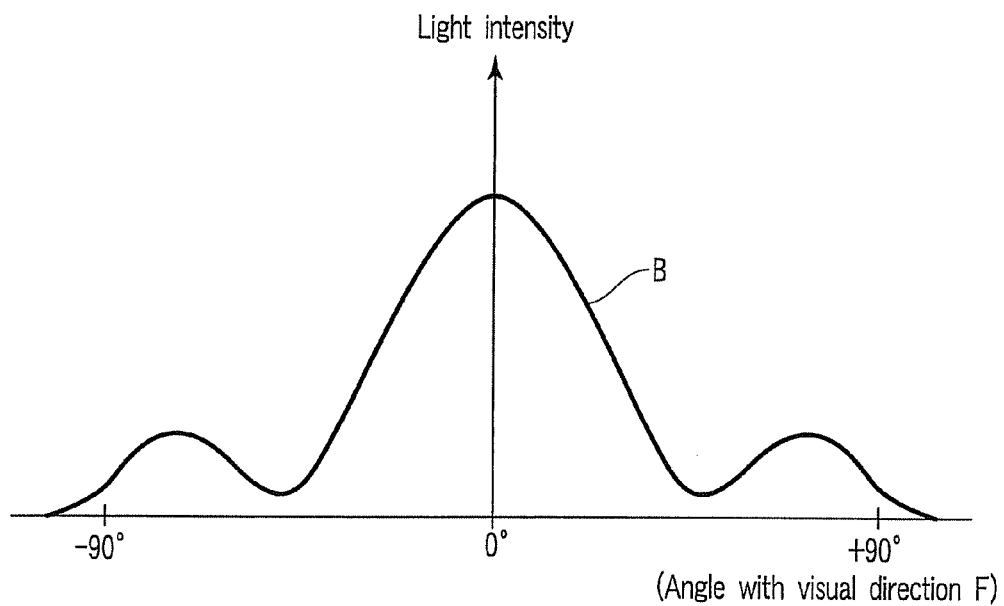
FIG. 3 is a chart showing a light intensity distribution with respect to angles with a visual direction of the BEF.
Figure 4:
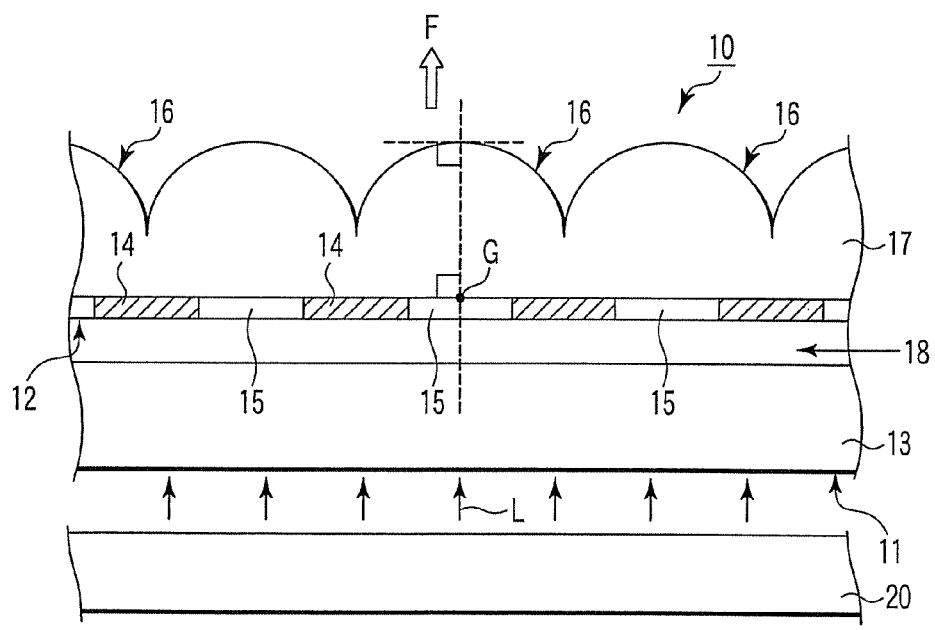
FIG. 4 is a side view showing one example of an optical sheet according to an embodiment of the present invention.

FIG. 4 is a side view showing one example of an optical sheet according to an embodiment of the present invention.

Namely, an optical sheet 10 according to the present embodiment has a light diffusion layer 13 which conduct a light beam L from a light source 20 thereinto from an incident surface 11, and scatters the light toward an outgoing surface 12 side.

As the light diffusion layer 13, as is well known in the art, there is used a layer having a structure in which resin beads or fine particles (fillers) with different refractive indexes are included in transparent resin, or a layer having a structure whose one side is processed to have a mat shape.

Figure 5:
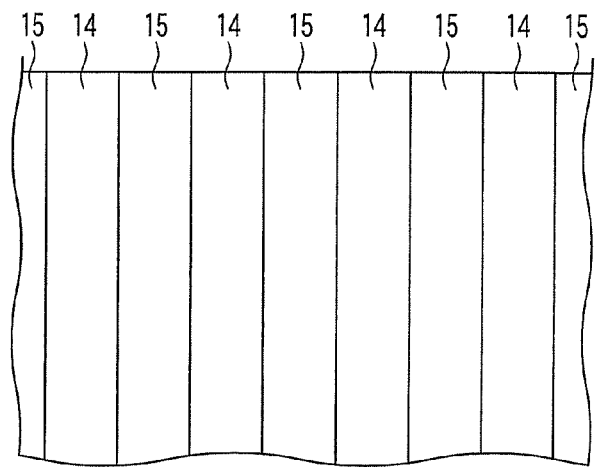
FIG. 5 is a plan view showing an example of a stripe form layout of a light reflection layer and opening portions.

Further, a light reflection layer 14 is fixed to the outgoing surface 12 of the light diffusion layer 13 with an adhesion layer 18. The light reflection layer 14 is formed from, for example, white ink, metallic foil, or metallized layer, and as shown in the plan view of FIG. 5, has provided thereon a plurality of opening portions 15 formed from, for example, regular air layers.

Moreover, the other surface of the light reflection layer 14 (the upper surface of the light reflection layer 14 shown in FIG. 4) has fixed thereon a lens sheet 17 formed by disposing on its own surface a plurality of unit lenses 16.

As the adhesion layer 18, for example, an ultraviolet curing resin (hereinafter called "UV cure adhesive" as well) or another type of adhesive is used, and there are cases in which a diffusing agent may be mixed thereinto in order to improve the diffusivity of the light diffusion layer 13. In consideration of the adhesion property left even after manufacturing the optical sheet 10, chances of bringing about a reduction in durability characteristic or optical characteristic over time are low. Thus, a polymerizing-adhesive strength changeable by ultraviolet curing resin type is favorably used. Further, when the adhesion layer 18 formed from an ultraviolet curing resin is formed on the entire surface of the lens sheet 17, provided that the adhesion layer 18 is hardened, it is easy to prevent the portions not contacting the light reflection layer 14 from being inserted into the opening portions 15, which is favorable.

Figure 6:
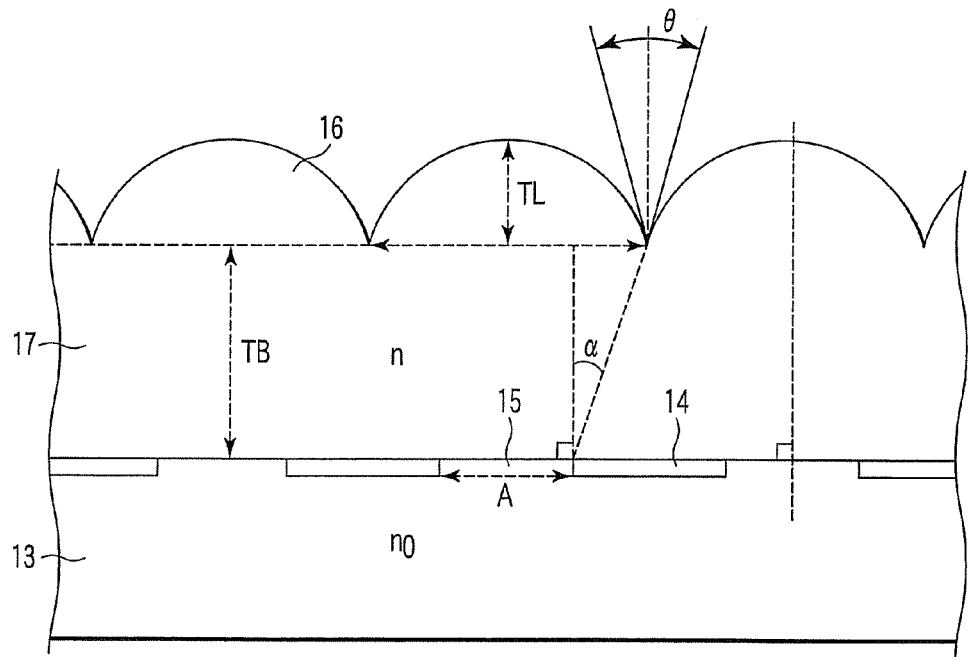
FIG. 6 is a partial side view showing a detailed structural example of the optical sheet according to the embodiment.

FIG. 6 is a side view showing a structural example of the lens sheet 17.

In the example shown in FIG. 6, the lens sheet 17 has a lens unit in which the unit lenses 16 formed from semi-tubular convex cylindrical lenses with a height TL are arrayed in parallel at a pitch P on one side surface, and has the light reflection layer 14 with high light reflectivity which reflects toward the light source 20 side, on the other surface. In the light reflection layer 14, the opening portions 15 formed from, for example, air layers with a width A corresponding to the respective unit lenses 16 of the lens sheet 17 one-to-one are disposed in a stripe form. Then, this is structured such that, in order for a light beam incident onto the opening portions 15 to be efficiently incident to the semi-tubular convex cylindrical lenses, spaces between the opening portions 15 and the semi-tubular convex cylindrical lenses are filled with a material with a refractive index n which is the same as or close to that of the semi-tubular convex cylindrical lenses.

In the lens sheet 17 structured in this way, in order for a light beam to be efficiently incident onto the unit lenses 16 formed from the semi-tubular convex cylindrical lenses, given that a distance from a valley portion between the unit lenses 16 up to the surface on the other side is TB, a relation of $$P \leq A + 2*TB*\tan \alpha$$

is satisfied. In this formula, a is a critical angle at the interface with the lens sheet 17 in the opening portions 15, and is defined as $\alpha = \sin^{-1}(n_0/n)$ by using the refractive index $n_0$ of the opening portions 15.

Figure 7:
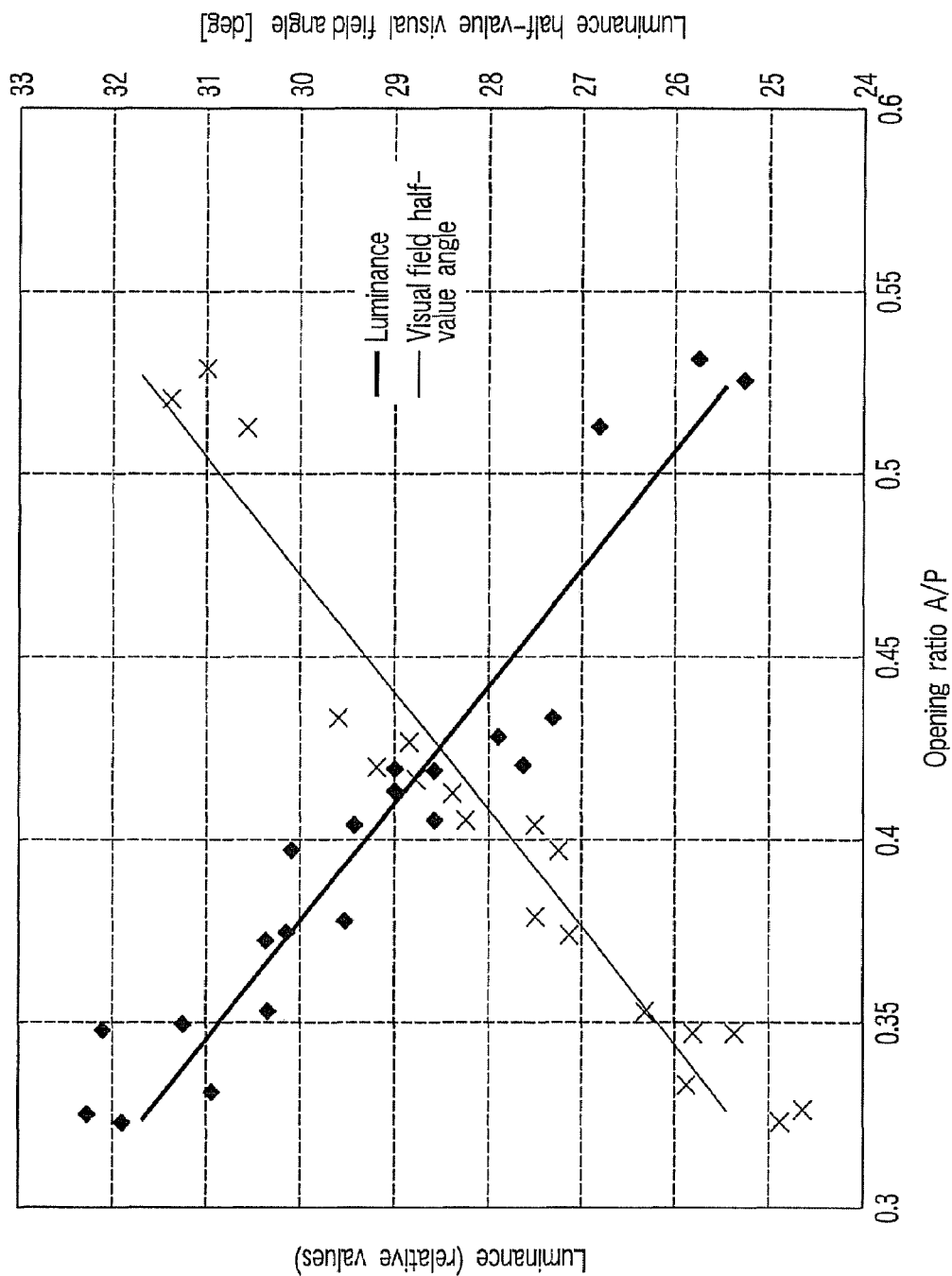
FIG. 7 is a graph showing general relations among opening ratios, luminance, and visual field half-value angles.

On the other hand, A/P corresponds to an opening ratio. However, as shown in FIG. 7, there is the general characteristic that the greater the opening ratio A/P is, the more the visual field half-value angle is improved, but the luminance is lowered. Therefore, it is necessary to set the opening ratio A/P in consideration of a balance between the luminance and visual field half-value angle. Therefore, among a height TL, a distance TB, a width A of the opening portion, and a pitch P, relations of $$0.3 < TL/P < 0.6 \qquad \text{formula (1)},$$

$$0.3 < TB/P < 1.0 \qquad \text{formula (2), and}$$

$$0.3 < A/P < 0.6 \qquad \text{formula (2)}$$

are formed.

In the formula (1), when TL/P is less than or equal to 0.3, the focusing property of a lens is insufficient, and when TL/P exceeds 0.6, the directivity of the lens is too strong, which is not suitable for TV use, and molding thereof is made difficult.

In the formula (2), when TB/P is out of the above-described range, it is impossible to efficiently guide the light to the lenses, which results in an increase in light quantity loss.

In the formula (3), when A/P is less than or equal to 0.3, the directivity is too strong, and absorption in a white reflection layer appears prominently, which results in an increase in light quantity loss. In contrast thereto, when A/P is greater than or equal to 0.6, the diffusion characteristic is too strong (the focusing property is weak), and it is difficult to improve the front surface luminance.

Further, a range of an angle θ formed with a boundary (valley portion) between the unit lenses 16 adjacent to one another is preferably from 35° to 60° as will be described hereinafter.

Namely, when an angle θ formed with a boundary (valley portion) between the unit lenses 16 adjacent to one another is less than 35°, the mold-releasing property after molding is degraded, or it becomes impossible to mold-release a molded item due to a tip of a metallic mold being bent by repeating molding. In addition, the life of the metallic mold tends to be shorter due to a tip of the metallic mold being damaged at the time of handling the metallic mold. Further, in order to broaden an orientation characteristic by the unit lenses 16, it suffices to make a curvature radius of a semi-tubular convex cylindrical lens smaller, or to design a cross-sectional shape thereof to be an aspherical (elliptic) shape. However, provided that an angle θ formed with a boundary (valley portion) between the unit lenses 16 adjacent to one another is made less than or equal to 60°, it is possible to realize a satisfactory orientation characteristic.

On the other hand, when the above-described angle θ exceeds 60°, the shapes of the unit lenses 16 are made smooth. Thus, the lens function is degraded, and the orientation angle is made narrow, which goes against the object of the present invention directed to improvement of the light intensity in the visual direction of the viewer.

Note that the unit lenses 16 are not limited to the semi-tubular convex cylindrical lenses, and a lens sheet in which convex lenses are arrayed in two dimensions, a lenticular sheet having a lens unit in which semi-tubular convex cylindrical lenses are arranged as the unit lenses 16 in parallel in one direction, and another lens sheet, do not deviate from the spirit of the present invention.

Such a lens sheet 17 is a monolithic compact molded by press molding or extrusion molding a thermoplastic resin which has been well known in the art, by using, for example, PET (polyethylene terephthalate), PC (polycarbonate), PMMA (polymethyl methacrylate), COP (cycloolefin polymer), or the like. Alternatively, this may be formed by ultraviolet curing molding in which an ultraviolet curing resin is disposed on a base material such as PET (polyethylene terephthalate), PP (polypropylene), PC (polycarbonate), PMMA (polymethyl methacrylate), PE (polyethylene), or the like.

The opening portions 15 have refractive indexes lower than that of the light diffusion layer 13 and the lens sheet 17, and are formed at positions corresponding to each of the plurality of unit lenses 16.

The areas at which the opening portions 15 are formed are set such that respective lines, connecting the apexes of the respective unit lenses 16 in the lens sheet 17 with centers G on the respective cross sections obtained when it is assumed that the planes of the light reflection layer 14 (the upper surfaces of the light reflection layer 14 shown in FIG. 4) of the respective opening portions 15 corresponding to the respective unit lenses 16 are cross sections, are substantially orthogonal to the planes of the light reflection layer 14 (the upper surfaces of the light reflection layer 14 shown in FIG. 4).

In other words, the opening portions 15 are formed such that the centers G in cross sections of the respective opening portions 15 exist on the vertical lines made along the thickness direction of the optical sheet 10 from the apexes of the respective unit lenses 16.

Alternatively, the light reflection layer 14 may be provided at areas including non-light condensing surfaces by the unit lenses 16, and the opening portions 15 may be provided at the areas other than the light reflection layer 14. Note that not only the flat surfaces but also convex portions or concave portions may be formed on the surfaces of the opening portions 15. In the case of convex shapes, the convex portions are preferably made lower than the convex portions corresponding to the stripes in manufacturing.

As widths A of the opening portions 15 are made greater, scattered light beams which have not been sufficiently narrowed are incident onto the unit lenses 16. As a result, as described above, optic elements which are not emitted in the visual direction F of a viewer are increased.

On the other hand, as the widths A of the opening portions 15 are made smaller, only scattered lights which have been narrowed more evenly are incident onto the unit lenses 16, and as the case may be, unevenness in outgoing light beams emitted from the unit lenses 16 is increased.

Accordingly, the shapes and the widths A of the opening portions 15 are design matters determined in accordance with the specifications required for the optical sheet 10.

For example, in the case of using a lenticular sheet as described above as the lens sheet 17, when parallel light beams are incident from the lens unit side, by providing the light-transmitting stripe-form opening portions 15, for example, as air layers, so as to include the areas onto which the incident parallel light beams are condensed by the focusing action of the lens unit, non-opening portions are formed from the stripe-form light reflection layer 14, and a pitch of the parallel semi-tubular convex cylindrical lenses and a formation pitch of the stripe-form opening portions 15 may be made equal.

The light reflection layer 14, formed so as to be partially penetrated by the plurality of opening portions 15 regularly disposed as described above, is formed by use of a print method, a transfer method, a photolithography method, or the like which has been well known in the art. Alternatively, the light reflection layer 14 is formed by applying formation or transferring formation of an ink layer formed by dispersion mixing metallic filler, laminating formation of metallic foil, or the like.

Alternatively, as one type of photolithography method, a so-called "self-alignment technique" by which areas at which the opening portions 15 are formed are specified by utilizing the focusing property of lenses themselves is used.

At the time of specifying the opening portions 15 by the self-alignment technique, as shown in FIG. 4, in order for the opening portions 15 corresponding to the respective unit lenses 16 to include the vertical lines made from the apexes of the unit lenses 16 to the rear faces of the lens sheet 17, it is necessary to irradiate parallel light beams onto the entire surface of the lens sheet 17 from the unit lenses 16 side.

Further, there may be cases in which photosensitive resin layers used at the time of the self-alignment technique are left on the opening portions 15 to be specified. However, in consideration of the optical characteristic and the durability characteristic after manufacturing the optical sheet 10, a photosensitive resin of a type in which the transparency is maintained is favorably used, and a type whose refractive index is lower than that of the lens sheet 17 (which is close to that of the air for example) is more favorable.

Next, the effect of the optical sheet according to the above-described example structured as described above will be described by use of FIG. 8.

Namely, in the optical sheet 10 according to the present embodiment, the light L from the light source 20 is incident from the incident surface 11 of the light diffusion layer 13. The light L incident onto the light diffusion layer 13 is randomly scattered here. Among the light beams scattered in this way, only light beams γ having passed through the opening portions 15 are guided to the lens sheet 17.

Because the respective opening portions 15 are respectively provided so as to face the apexes of the respective unit lenses 16 provided to the lens sheet 17, only light beams narrowed by the corresponding respective opening portions 15 are guided to the respective unit lenses 16.

Namely, since only the light beams γ whose scattering angles are narrowed are incident onto the respective unit lenses 16 due to the respective opening portions 15 functioning as slits, there are no light beams obliquely incident onto the unit lenses 16. Therefore, it is possible to eliminate light beams emitted wastefully in a cross direction that are not in the visual direction F of a viewer. On the other hand, light beams β which have not been able to pass through the opening portions 15 are reflected on the light reflection layer 14 to be returned to the light diffusion layer 13 side.

Then, after the light beams β are scattered at the light diffusion layer 13 in the same way, the light beams β become light beams γ whose scattering angles are narrowed, and the light beams γ pass through the opening portions 15 to be incident onto the unit lenses 16, and are diffused within predetermined angles φ by the unit lenses 16, and thereafter, the light beams β are emitted.

In this way, the light L from the light source 20 is scattered, only the light beams γ whose scattering angles are narrowed can be incident onto the unit lenses 16, and light beams which have not been able to be incident onto the unit lenses 16 can be reutilized so as to be not emitted wastefully. Therefore, it is possible to emit the light from the light source 20 so as to control a diffusing range while improving the utilizing efficiency thereof.

Figure 9:
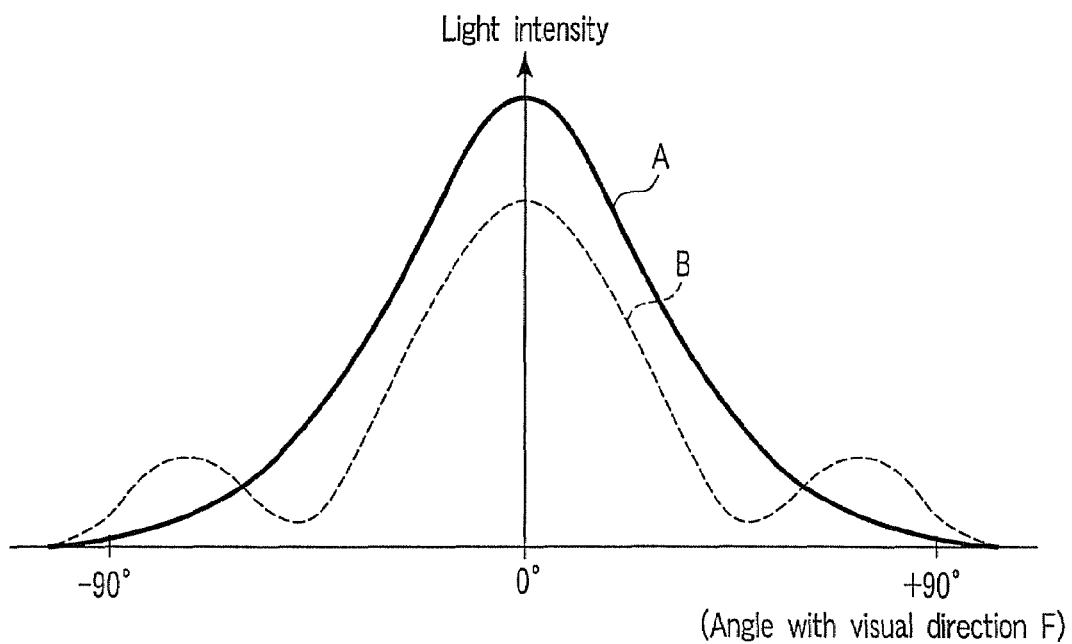
FIG. 9 is a chart showing light intensity distributions with respect to angles with a visual direction of the optical sheet according to the embodiment.

In accordance therewith, as shown in FIG. 9, a light intensity distribution A emitted from the optical sheet 10 according to the present embodiment is made to be a distribution in which the small light intensity peaks in the vicinity of ±90° on the abscissa in the drawing as in the light intensity distribution B emitted from the optical sheet using the BEF are eliminated, and it is possible to further enhance the light intensity in the visual direction F of a viewer centering on 0° shown on the abscissa in the drawing.

Figure 8:
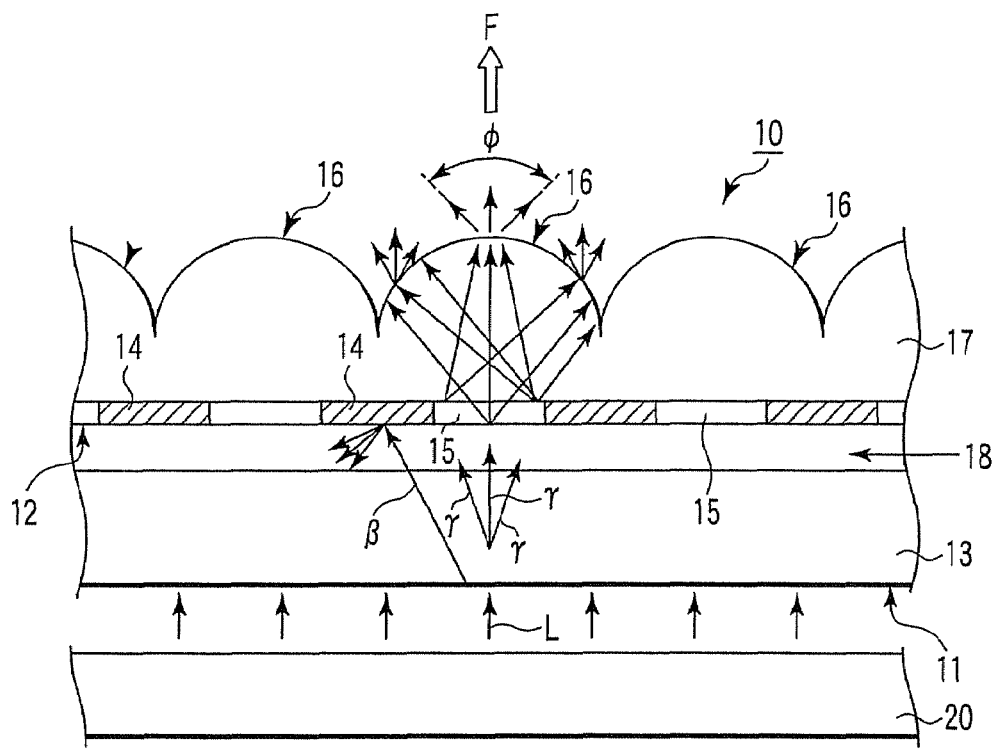
FIG. 8 is a diagram for explanation of an optical effect of the optical sheet according to the embodiment.

Note that, in order to further control the light beams emitted from the unit lenses 16, there may be further provided a light scattering layer formed from a sheet or a film with a light scattering characteristic, and a reflective polarization split film (the both are not shown) at the light outgoing surface side which is the upper side of the unit lenses 16 in FIGS. 4 and 8.

Here, various concrete examples of the optical sheet according to the above-described embodiment will be described.

EXAMPLE 1

On one surface of a PET film (75 μm thickness), a cylindrical lens group of the unit lenses 16 with a radius of curvature of 100 μm, and a layout pitch of 200 μm is formed from hardened material of acrylic ultraviolet curing resin.

As the light reflection layer 14, a white ink layer (15 μm thickness) is formed by the transferring method such that a ratio between the opening portions 15 and the light reflection layer 14 is made to be one-to-one.

At this time, $P \leq A + 2*TA* \tan \alpha$ is satisfied, which leads to $TL/P=0.31,$ $TB/P=0.38,$ and $A/P=0.5,$ and the optical sheet satisfies the aforementioned conditions of (1) to (3).

EXAMPLE 2

On one surface of a PET film (75 μm thickness), a cylindrical lens group of the unit lenses 16 with a radius of curvature of 100 μm, and a layout pitch of 200 μm is formed from hardened material of acrylic ultraviolet curing resin.

As the light reflection layer 14, a white ink layer (15 μm thickness) is formed by the transferring method such that a ratio between the opening portions 15 and the light reflection layer 14 is made to be one-to-one.

Further, as the adhesion layer 18, an acrylic pressure sensitive adhesive material or a thermosensitive adhesive material (5 μm thickness) is formed, and is laminated with a PET film (75 μm thickness) which will be the light diffusion layer 13 to prepare the optical sheet 10.

In this way, a thickness of the adhesion layer 18 is thinner than that of the white ink layer serving as the light reflection layer 14. Accordingly, when the adhesion layer 18 is formed over the entire surface of the lens sheet 17, it is possible to prevent the optical characteristic from being affected on the basis of a difference between the refractive indexes in accordance with the fact that the portions not contacting the light diffusion layer 13 enter and fill up the opening portions 15.

EXAMPLE 3

On one surface of a PET film (75 μm thickness), a cylindrical lens group of the unit lenses 16 with a radius of curvature of 100 μm, and a layout pitch of 200 μm is formed from hardened material of acrylic ultraviolet curing resin.

As the light reflection layer 14, a white ink layer (15 μm thickness) is formed by the transferring method such that a ratio between the opening portions 15 and the light reflection layer 14 is made to be one-to-one.

Further, as the adhesion layer 18, an acrylic pressure sensitive adhesive material or a thermosensitive adhesive material (5 μm thickness) to which 10% by weight of spherical-shaped acrylic resin fillers (average particle diameter 5 μm) serving as a diffusion material is added is provided, and is laminated with a PET film (75 μm thickness) which will be the light diffusion layer 13 to prepare the optical sheet 10.

In this case as well, in the same way as in example 2, a thickness of the adhesion layer 18 is thinner than that of the white ink layer serving as the light reflection layer 14.

EXAMPLE 4

On one surface of a PET film (75 μm thickness), a cylindrical lens group of the unit lenses 16 with a radius of curvature of 100 μm, and a layout pitch of 200 μm is formed from hardened material of acrylic ultraviolet curing resin.

As the light reflection layer 14, a white ink layer (15 μm thickness) is formed by the transferring method such that a ratio between the opening portions 15 and the light reflection layer 14 is made to be one-to-one.

Further, as the adhesion layer 18, a UV cure adhesive material (5 μm thickness) is provided, and is laminated with a PET film (75 μm thickness) which will be the light diffusion layer 13 to prepare the optical sheet 10.

In this case as well, in the same way as in example 2, a thickness of the adhesion layer 18 is thinner than that of the white ink layer serving as the light reflection layer 14.

EXAMPLE 5

On one surface of a PET film (75 μm thickness), a cylindrical lens group of the unit lenses 16 with a radius of curvature of 100 μm, and a layout pitch of 200 μm is formed from hardened material of acrylic ultraviolet curing resin.

As the light reflection layer 14, a white ink layer (15 μm thickness) is formed by the transferring method such that a ratio between the opening portions 15 and the light reflection layer 14 is made to be one-to-one.

Further, as the adhesion layer 18, a UV cure adhesive material (5 μm thickness) to which 10% by weight of spherical-shaped acrylic resin fillers (average particle diameter 5 μm) serving as a diffusion material is added is provided, and is laminated with a PET film (75 μm thickness) which will be the light diffusion layer 13 to prepare the optical sheet 10.

In this case as well, in the same way as in example 2, a thickness of the adhesion layer 18 is thinner than that of the white ink layer serving as the light reflection layer 14.

EXAMPLE 6

On one surface of a PET film (75 μm thickness), a cylindrical lens group of the unit lenses 16 with a radius of curvature of 100 μm, and a layout pitch of 200 μm is formed from hardened material of acrylic ultraviolet curing resin.

As the light reflection layer 14, a white ink layer (15 μm thickness) is formed by the transferring method such that a ratio between the opening portions 15 and the light reflection layer 14 is made to be one-to-one.

Further, as the adhesion layer 18, an acrylic pressure sensitive adhesive material or a thermosensitive adhesive material (5 μm thickness) is provided, and is laminated with a diffusion film (100 μm thickness, haze factor 90%, transmission factor 90%) which will be the light diffusion layer 13 to prepare the optical sheet 10.

In this case as well, in the same way as in example 2, a thickness of the adhesion layer 18 is thinner than that of the white ink layer serving as the light reflection layer 14.

EXAMPLE 7

On one surface of a PET film (75 μm thickness), a cylindrical lens group of the unit lenses 16 with a radius of curvature of 100 μm, and a layout pitch of 200 μm is formed from hardened material of acrylic ultraviolet curing resin.

As the light reflection layer 14, a white ink layer (15 μm thickness) is formed by the transferring method such that a ratio between the opening portions 15 and the light reflection layer 14 is made to be one-to-one.

Further, as the adhesion layer 18, an acrylic pressure sensitive adhesive material or a thermosensitive adhesive material (5 μm thickness) to which 10% by weight of spherical-shaped acrylic resin fillers (average particle diameter 5 μm) serving as a diffusion material is added is provided, and is laminated with a diffusion film (100 μm thickness, haze factor 90%, transmission factor 90%) which will be the light diffusion layer 13 to prepare the optical sheet 10.

In this case as well, in the same way as in example 2, a thickness of the adhesion layer 18 is thinner than that of the white ink layer serving as the light reflection layer 14.

EXAMPLE 8

On one surface of a PET film (75 μm thickness), a cylindrical lens group of the unit lenses 16 with a radius of curvature of 100 μm, and a layout pitch of 200 μm is formed from hardened material of acrylic ultraviolet curing resin.

As the light reflection layer 14, a white ink layer (15 μm thickness) is formed by the transferring method such that a ratio between the opening portions 15 and the light reflection layer 14 is made to be one-to-one.

Further, as the adhesion layer 18, a UV cure adhesive material (5 μm thickness) is provided, and is laminated with a diffusion film (100 μm thickness, haze factor 90%, transmission factor 90%) which will be the light diffusion layer 13 to prepare the optical sheet 10.

In this case as well, in the same way as in example 2, a thickness of the adhesion layer 18 is thinner than that of the white ink layer serving as the light reflection layer 14.

EXAMPLE 9

On one surface of a PET film (75 μm thickness), a cylindrical lens group of the unit lenses 16 with a radius of curvature of 100 μm, and a layout pitch of 200 μm is formed from hardened material of acrylic ultraviolet curing resin.

As the light reflection layer 14, a white ink layer (15 μm thickness) is formed by the transferring method such that a ratio between the opening portions 15 and the light reflection layer 14 is made to be one-to-one.

Further, as the adhesion layer 18, a UV cure adhesive material (5 μm thickness) to which 10% by weight of spherical-shaped acrylic resin fillers (average particle diameter 5 μm) serving as a diffusion material is added is provided, and is laminated with a diffusion film (100 m thickness, haze factor 90%, transmission factor 90%) which will be the light diffusion layer 13 to prepare the optical sheet 10.

In this case as well, in the same way as in example 2, a thickness of the adhesion layer 18 is thinner than that of the white ink layer serving as the light reflection layer 14.

Next, the performance, exhibited when the optical sheets 10 according to the above-described examples 1 to 9 are applied to a backlight unit for a display in a 26-inch liquid crystal television, was evaluated. As conditions for the evaluation, a television structure formed from a cold-cathode tube, an optical sheet group, and a liquid crystal panel is used, and a distribution of visual field angles of display luminance is evaluated sequentially by the following factors as the optical sheet group by use of a luminance meter (EZlite manufactured by Eldim).

Figure 10:
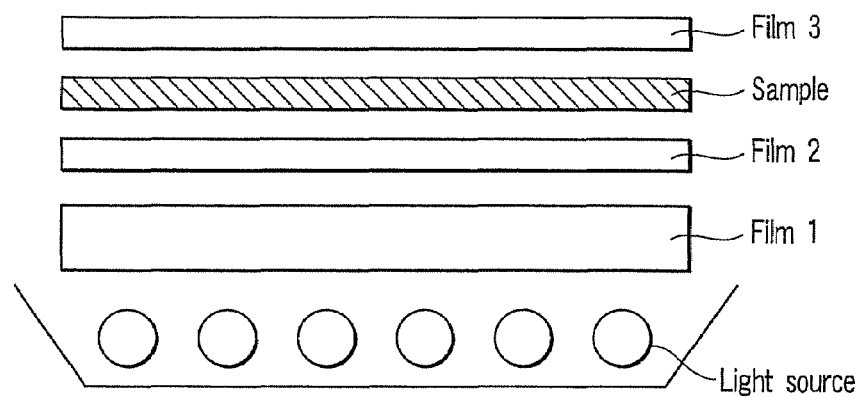
FIG. 10 is a conceptual diagram showing a structure of the backlight for performance evaluation when the optical sheet according to the embodiment is applied to a backlight for a display.

When a BEF, manufactured by the U.S. 3M company is used as a brightness enhancement film, generally, a structure as shown in FIG. 10 is used. As functions of the respective parts, the diffusion plate has an effect of eliminating a shadow of the light source by diffusing a light beam from the light source, and serves as a base for laminating various optical films thereon. The lower diffusion film has a function of diffusing when only the diffusion by the diffusion plate is insufficient, and the reflective polarization split film is, for example, generally a DBEF serving as a reflective polarizing film manufactured by the U.S. 3M company, and has an object to reflect and reutilize a polarized beam to be eliminated by nature through a polarizing film laminated onto a liquid crystal panel. Further, as regards the characteristic of visual field angles of luminance of the BEF, wasteful emission of light in a cross direction is reduced as shown in FIG. 11 by the DBEF function.

Figure 11:
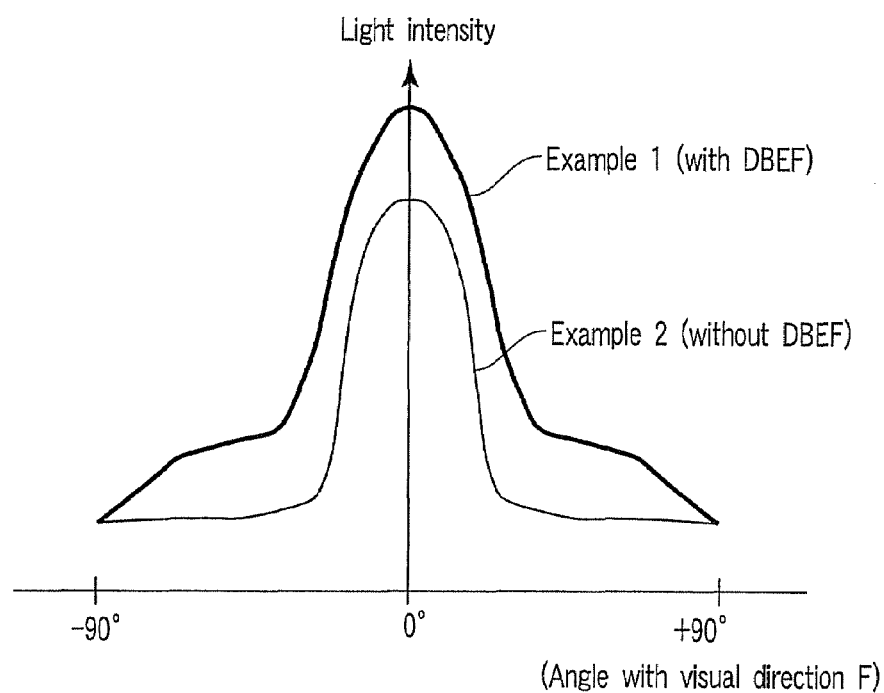
FIG. 11 is a chart showing light intensity distributions in the backlight to which the optical sheet according to Example 1 is applied.

Note that the luminance distribution chart shown in FIG. 11 shows luminance distributions of light with a specific polarization component, and shows that a quantity of light with a component of a polarization axis passing through a polarization element on the lower side of the liquid crystal layer of a quantity of light from the backlight incident onto the liquid crystal element rises by use of the DBEF.

The "upper diffusion film" and "lower diffusion film" in the concrete comparative structures shown in FIGS. 10, 12A, and 12B, and the embodiment have directivities in light scattering (diffusion), which shows that there is a difference in the characteristics: there are many scatter-emitting components in the upper direction or in the lower direction of the screen in an incident light beam.

Specifications of the respective films are as follows.

Lower diffusion film 1: film thickness 2 mm, haze factor 95%, transmission factor 80%.

Lower diffusion film 2: film thickness 100 μm, haze factor 90%, transmission factor 90%.

Lower diffusion film 3: film thickness 100 μm, haze factor 40%, transmission factor 90%.

Evaluation for image on the display has been carried out under the above-described comparative structures and the example structures.

Note that the diffusion plate has an effect of diffusing light in the same way as a diffusion film. However, in contrast to the fact that the diffusion film is structured so as to be flexible on a thin film, the diffusion plate is formed by extrusion molding, and has a thickness larger than that of the diffusion film, and a high rigidity.

In this way, it is necessary to use many optical films in a general structure. However, the optical sheet according to the first aspect of the present invention is designed so as to hardly produce any wasted outgoing light in a cross direction even in a state in which there is no reflective polarization split film as in FIG. 11. Therefore, even when the reflective polarization split film is replaced with a normal diffusion film, or is removed, the optical characteristic is not deteriorated.

Further, in the optical sheet according to the second aspect of the present invention, even when the diffusion plate and the lower diffusion film are removed, the optical characteristic is not deteriorated.

Accordingly, the invention is highly effective in terms of, not only the optical characteristic, but also a reduction in the number of components.

The optical sheet according to the embodiment of the present invention as described above is effective not only in the case of application to a liquid crystal television with a relatively large screen having a direct-type light source, but also in the case of application to a medium with a small-scale display having a backlight unit with an edge-light type light source, or a light source formed from a cold-cathode tube or an LED, and a waveguide plate.

What is claimed is:

1. An optical sheet for use in illumination light control in a backlight unit for a display, comprising:
   a light diffusion layer which diffuses illumination light toward an emission surface side of the light diffusion layer, which is a non-incidence surface side thereof;
   an adhesion layer or an adhesive layer;
   a light reflection layer which is adhered to the light diffusion layer by the adhesion layer or the adhesive layer, which has a front surface extending along the emission surface side of the light diffusion layer, and having a high reflectivity with respect to the emission surface side of the light reflection layer, and which reflects the light diffused by the light diffusion layer toward the light diffusion layer; and
   a lens sheet having a flat reverse surface fixed to the other surface of the light reflection layer, and a front surface on which a plurality of unit lenses are provided,
   wherein:
     the light diffusion layer, the adhesion layer or the adhesive layer, the light reflection layer and the lens sheet are provided in this order from an incidence side of the illumination light;
     the light reflection layer includes opening portions which are formed therein in positions corresponding to those of the unit lenses, respectively; and
     the adhesion layer or the adhesive layer is thinner than the light reflection layer.

2. The optical sheet according to claim 1, wherein:
   the lens sheet includes a lens unit wherein as the unit lens, semi-tubular convex cylindrical lenses are arranged in parallel, or convex lenses are two-dimensionally arranged; and
   the light reflection layer is striped to have stripe opening portions having light transmission characteristics and including areas onto which parallel light beams incident from a lens unit-side onto the lens sheet are condensed by a focusing action of the lens unit, and a pitch of arrangement of the parallel semi-tubular convex cylindrical lenses is equal to a pitch of arrangement of the stripe opening portions.

3. The optical sheet according to claim 1, wherein the light reflection layer has convex portions formed on a surface of the light reflection layer located which is located opposite to the lens unit, the convex portions being arranged in a stripe manner and located to correspond to the unit lenses of the convex cylindrical lenses, respectively.

4. The optical sheet according to claim 1, wherein the adhesion layer or the adhesive layer is any of ultraviolet curing resin layer, a pressure sensitive adhesive layer or a thermosensitive adhesive layer.

5. The optical sheet according to claim 1, wherein the adhesion layer or the adhesive layer contains light diffusion fine particles.

6. The optical sheet according to claim 1, wherein the light reflection layer is formed of any of white ink, metallic foil or a metallized layer.

7. The optical sheet according to claim 1, wherein the lens sheet is a monolithic compact formed by press molding or extrusion molding using a thermoplastic resin.

8. The optical sheet according to claim 1, wherein the lens sheet has a laminated structure in which the unit lenses are formed of hardened material of radiation hardening resin, and are polymerizing-adhered onto a surface of a base material sheet.

9. A backlight unit for a display comprising at least a direct-type light source and the optical sheet according to claim 1, on a back surface of an image display element specifying a display image.

10. A backlight unit for a display comprising at least a surface light source and the optical sheet according to claim 1, on a back surface of an image display element specifying a display image, the surface light source comprising an edge-light type light source and a waveguide.

11. A display comprising:
   an image display element which comprises a liquid crystal display element specifying a display image in accordance with transmission/prevention of light-transmittance in units of one pixel;
   a light source which comprises a cold-cathode tube or an LED; and
   the optical sheet according to claim 1.

12. An optical sheet for use in illumination light control in a backlight unit for a display, comprising:
   a lenticular sheet including a lens unit in which a group of convex cylindrical lenses are formed in parallel with each other, and having a surface located opposite to the lens unit,
   wherein:
     light reflection parts are provided at areas of the surface of the lenticular sheet, which are close to a focal point of the lens unit;
     light transmission parts are provided located at the other areas of the surface of the lenticular sheet; and
     at the lenticular sheet, on boundaries between adjacent unit lenses, a tangent line at a valley portion of any adjacent two of the unit lenses falls within a range of 35 to 60°.

13. The optical sheet according to claim 12, wherein the light transmission parts are not flat, and have surfaces in which convex or concave portions are formed.

14. The optical sheet according to claim 12, wherein the light transmission parts contain at least convex or concave cylindrical lenses formed therein.

15. The optical sheet according to claim 12, wherein the light reflection portion is striped to have convex portions at the surface located opposite to the lens unit and to corresponding unit lenses of the convex cylindrical lenses, respectively.

16. The optical sheet according to claim 12, wherein the lens sheet is a monolithic compact formed by press molding or extrusion molding using a thermoplastic resin.

17. The optical sheet according to claim 12, wherein the lenticular sheet has a laminated structure in which the lens unit is formed on a surface of a light-transmission base material formed in the shape of a sheet.

18. The optical sheet according to claim 12, wherein each of the light reflection parts is formed by applying formation or transferring formation of an ink layer formed by dispersively mixing filler metal, or laminating formation of metallic foil.

19. An optical sheet for use in illumination light control in a backlight unit for a display, comprising:
   a light diffusion layer which diffuses illumination light toward an emission surface side of the light diffusion layer, which is a non-incidence surface side thereof;
   an adhesion layer or an adhesive layer;
   a light reflection layer which is adhered to the light diffusion layer by the adhesion layer or the adhesive layer, which has a front surface extending along the emission surface side of the light diffusion layer, and having a high reflectivity with respect to the emission surface side of the light reflection layer, and which reflects the light diffused by the light diffusion layer toward the light diffusion layer; and
   a lenticular sheet including a lens unit having a flat reverse surface fixed to the other surface of the light reflection layer, and a front surface on which a group of convex cylindrical lenses are arranged in parallel, the lenticular sheet having a surface located opposite to the lens unit,
   wherein:
      the light diffusion layer, the adhesion layer or the adhesive layer, the light reflection layer and the lenticular sheet are provided in this order from an incidence side of the illumination light;
      at the lenticular sheet, on boundaries between adjacent unit lenses, a tangent line at a valley portion of any adjacent two of the unit lenses falls within a range of 35 to 60°;
      the light reflection layer includes opening portions which are formed therein to correspond to the unit lenses, respectively; and
      the adhesion layer or the adhesive layer is thinner than the light reflection layer.

20. The optical sheet according to claim 19, wherein the opening portions are formed of air layers.

21. The optical sheet according to claim 19, wherein the opening portions are formed of material having a lower refractive index than that of the lenticular sheet.

22. The optical sheet according to claim 19, wherein the adhesion layer or the adhesive layer is any of ultraviolet curing resin layer, a pressure sensitive adhesive layer and a thermosensitive adhesive layer.

23. The optical sheet according to claim 19, wherein the adhesion layer or the adhesive layer contains light diffusion fine particles.

24. The optical sheet according to claim 19, wherein the light reflection layer is formed of any of white ink, metallic foil and a metallized layer.

25. The optical sheet according to claim 19, wherein the lens sheet is a monolithic compact formed by press molding or extrusion molding using a thermoplastic resin.

26. The optical sheet according to claim 19, wherein the lens sheet has a laminated structure in which the unit lenses are formed of hardened material of radiation hardening resin, and are polymerizing-adhered onto a surface of a base material sheet.

27. The optical sheet according to claim 19, further comprising a light diffusion layer which is formed of a sheet or film having light diffusion characteristics, on the emission surface side of the optical sheet.

28. The optical sheet according to claim 19, further comprising a reflective polarization split film on the emission surface side of the optical sheet.

29. A backlight unit for a display comprising at least a direct-type light source and the optical sheet according to claim 19, on a back surface of an image display element specifying a display image.

30. A backlight unit for a display comprising at least a surface light source and the optical sheet according to claim 19, on a back surface of an image display element specifying a display image, the surface light source comprising an edge-light type light source and a waveguide.

31. A display comprising:
   an image display element which comprises a liquid crystal display element specifying a display image in accordance with transmission of light or shutting out of light in units of one pixel;
   a light source which comprises a cold-cathode tube or an LED; and the optical sheet according to claim 19.

32. An optical sheet for use in illumination light control in a backlight unit for a display, comprising:
   a lens sheet including a lens unit in which a group of convex cylindrical lenses or triangular prisms are formed in parallel with each other, the lens sheet having a surface located opposite to the lens unit,
   wherein:
      light reflection parts are provided at areas of the surface of the lens sheet, which include boundaries between adjacent ones of unit lenses or unit prisms (or lower portions of valley portions of adjacent ones of unit lenses or unit prisms) which are included in the lens units,
      light transmission parts are provided at the other areas of the surface of the lens sheet; and
      the light reflection parts are arranged in a stripe manner to have convex portions at the surface opposite to the lens unit, the convex portions being arranged to correspond to the unit lenses of the convex cylindrical lenses, respectively.

33. The optical sheet according to claim 32, wherein the light transmission parts are not flat, and have surfaces in which convex or concave portions are formed.

34. The optical sheet according to claim 33, wherein the light transmission parts contain at least convex or concave cylindrical lenses formed therein.

35. The optical sheet according to claim 32, wherein the lens sheet is a monolithic compact formed by press molding or extrusion molding using a thermoplastic resin.

36. The optical sheet according to claim 32, wherein the lens sheet has a laminated structure in which the lens unit is formed on both surfaces of a light-transmission base material formed in the shape of a sheet.

37. The optical sheet according to claim 32, wherein each of the light reflection parts is formed by applying formation or transferring formation of an ink layer formed by dispersively mixing filler metal, or laminating formation of metallic foil.

38. An optical sheet for use in illumination light control in a backlight unit for a display, comprising:
a light diffusion layer which diffuses illumination light toward an emission surface side of the light diffusion layer, which is a non-incidence surface side thereof;
an adhesion layer or an adhesive layer;
a light reflection layer which is adhered to the light diffusion layer by the adhesion layer or the adhesive layer, which has a front surface extending along the emission surface side of the light diffusion layer, and having a high reflectivity with respect to the emission surface side of the light reflection layer, and which reflects the light diffused by the light diffusion layer toward the light diffusion layer; and
a lens sheet having a flat reverse surface fixed to the other surface of the light reflection layer, and a front surface on which a group of convex cylindrical lenses or triangular prisms are arranged in parallel,
wherein:
the light diffusion layer, the adhesion layer or the adhesive layer, the light reflection layer and the lens sheet are provided in this order from an incidence side of the illumination light;
the light reflection layer is striped to have convex portions at the surface located opposite to the lens unit, the convex portions being arranged to correspond to the unit lenses of the convex cylindrical lenses or the triangular prisms, respectively;
the light reflection layer includes opening portions which are formed and arranged to correspond to the unit lenses, respectively; and
the adhesion layer or the adhesive layer is thinner than the light reflection layer.

39. The optical sheet according to claim 38, wherein the adhesion layer or the adhesive layer is any of ultraviolet curing resin layer, a pressure sensitive adhesive layer or a thermosensitive adhesive layer.

40. The optical sheet according to claim 38, wherein the adhesion layer or the adhesive layer contains light diffusion fine particles.

41. The optical sheet according to claim 38, wherein the light reflection layer is formed of any of white ink, metallic foil and a metallized layer.

42. The optical sheet according to claim 38, wherein the lens sheet is a monolithic compact formed by press molding or extrusion molding using a thermoplastic resin.

43. The optical sheet according to claim 38, wherein the lens sheet has a laminated structure in which the unit lenses are formed of hardened material of radiation hardening resin, and are polymerizing-adhered onto a surface of a base material sheet.

44. The optical sheet according to claim 38, further comprising a light diffusion layer which is formed of a sheet or film having light diffusion characteristics, on the emission surface side of the optical sheet.

45. The optical sheet according to claim 38, further comprising a reflective polarization split film on the emission surface side of the optical sheet.

46. A backlight unit for a display comprising at least a direct-type light source and the optical sheet according to claim 38, on a back surface of an image display element specifying a display image.

47. A backlight unit for a display comprising at least a surface light source and the optical sheet according to claim 38, on a back surface of an image display element specifying a display image, the surface light source comprising an edge-light type light source and a waveguide.

48. A display comprising:
an image display element which comprises a liquid crystal display element specifying a display image in accordance with transmission of light or shutting out of light in units of one pixel;
a light source which comprises a cold-cathode tube or an LED; and
the optical sheet according to claim 38.

49. An optical sheet for use in illumination light control in a backlight unit for a display, comprising:
a light diffusion layer which is provided in the shape of a pattern, and diffuses illumination light toward an emission surface side of the light diffusion layer, which is a non-incidence surface side thereof;
an adhesion layer or an adhesive layer; and
a lens sheet including a light reflection layer which is adhered to the light diffusion layer by the adhesion layer or the adhesive layer, which has a front surface extending along the emission surface side of the light diffusion layer, and having a high reflectivity with respect to the emission surface side of the light reflection layer, and which reflects the light diffused by the light diffusion layer toward the light diffusion layer,
wherein:
the lens sheet has a flat reverse surface fixed to the other surface of the light reflection layer, and a front surface on which a group of convex lenses or triangular prisms are arranged in parallel;
the following relationship is satisfied:

$$P \leq A + 2*TB*\tan\alpha$$

where TB is a distance between a valley portion of concave and convex portions of the lens unit and the surface located opposite to the lens unit, A is a width of each of the light transmission parts, P is a pitch of arrangement of the convex lenses or the triangular prisms, and $\alpha$ is a critical angle at an interface between the light transmission parts and the lens sheet; and
the adhesion layer or the adhesive layer is thinner than the light reflection layer.

50. The optical sheet according to claim 49, wherein:
the following relationships are satisfied:

$$0.3 < TL/P < 0.6$$

$$0.3 < TB/P < 1.0$$

$$0.3 < A/P < 0.6$$

where TL is a height of the valley portion of the concave and convex portions of the lens unit, TB is the distance between the valley portion of the concave and convex portions and the surface located opposite to the lens unit, A is the width of said each light transmission part, and the P is the pitch of arrangement of the convex lenses or the triangular prisms; and
the adhesion layer or the adhesive layer is thinner than the light reflection layer.

51. The optical sheet according to claim 49,
wherein the light reflection layer includes opening portions which are formed therein to correspond to unit lenses, respectively and the opening portions are formed of material having a lower refractive index than that of the lens sheet.

52. An optical sheet for use in illumination light control in a backlight unit for a display, comprising:
a light diffusion layer which is provided in the shape of a pattern, and diffuses illumination light toward an emission surface side of the light diffusion layer, which is a non-incidence surface side thereof;
an adhesion layer or an adhesive layer;
a light reflection layer which is adhered to the light diffusion layer by the adhesion layer or the adhesive layer, which has a front surface extending along the emission surface side of the light diffusion layer, and having a high reflectivity with respect to the emission surface side of the light reflection layer, and which reflects the light diffused by the light diffusion layer toward the light diffusion layer; and
a lens sheet including a lens unit having a flat reverse surface fixed to the other surface of the light reflection layer, and a front surface on which a group of convex lenses or triangular prisms are arranged in parallel, the lens sheet having a surface located opposite to the lens unit,
wherein:
the light diffusion layer, the adhesion layer or the adhesive layer, the light reflection layer and the lens sheet are provided in this order from an incidence side of the illumination light;
the light reflection layer includes opening portions which are formed therein to correspond to unit lenses, respectively;
the opening portions are formed of material having a lower refractive index than that of the lens sheet; and
the adhesion layer or the adhesive layer is thinner than the light reflection layer.

53. The optical sheet according to claim 52, wherein the opening portions are formed of air layers.

54. The optical sheet according to claim 52, wherein the light reflection layer is formed by applying formation or transferring formation of an ink layer formed by dispersively mixing filler metal, or laminating formation of metallic foil.

55. The optical sheet according to claim 52, wherein the adhesion layer or the adhesive layer is any of ultraviolet curing resin layer, a pressure sensitive adhesive layer and a thermosensitive adhesive layer.

56. The optical sheet according to claim 52, wherein the adhesion layer or the adhesive layer contains light diffusion fine particles.

57. The optical sheet according to claim 52, wherein the light reflection layer is formed of any of white ink, metallic foil and a metallized layer.

58. The optical sheet according to claim 52, wherein the lens sheet is a monolithic compact formed by press molding or extrusion molding using a thermoplastic resin.

59. The optical sheet according to claim 52, wherein the lens sheet has a laminated structure in which the unit lenses are formed of hardened material of radiation hardening resin, and are polymerizing-adhered onto a surface of a base material sheet.

60. The optical sheet according to claim 52, further comprising a light diffusion layer which is formed of a sheet or film having light diffusion characteristics, on the emission surface side of the optical sheet.

61. The optical sheet according to claim 52, further comprising a reflective polarization split film on the emission surface side of the optical sheet.

62. A backlight unit for a display comprising at least a direct-type light source and the optical sheet according to claim 52, on a back surface of an image display element specifying a display image.

63. A backlight unit for a display comprising at least a surface light source and the optical sheet according to claim 52, on a back surface of an image display element specifying a display image, the surface light source comprising an edge-light type light source and a waveguide.

64. A display comprising:
an image display element which comprises a liquid crystal display element specifying a display image in accordance with transmission of light or shutting out of light in units of one pixel;
a light source which comprises a cold-cathode tube or an LED; and
the optical sheet according to claim 52.

65. An optical sheet for use in illumination light control in a backlight unit for a display, comprising:
a light diffusion layer which diffuses illumination light toward an emission surface side of the light diffusion layer, which is a non-incidence surface side thereof;
an adhesion layer or an adhesive layer;
a light reflection layer which is formed in the shape of a pattern comprising pattern portions arranged at regular intervals, and which is adhered to the light diffusion layer by the adhesion layer or the adhesive layer, which has a front surface extending along the emission surface side of the light diffusion layer, and having a high reflectivity with respect to the emission surface side of the light reflection layer, and which reflects the light diffused by the light diffusion layer toward the light diffusion layer; and
a lenticular sheet including a lens unit having a flat reverse surface fixed to the other surface of the light reflection layer, and a front surface on which a group of convex cylindrical lenses are arranged in parallel, the lenticular sheet having a surface located opposite to the lens unit;
wherein:
the light diffusion layer, the adhesion layer or the adhesive layer, the light reflection layer and the lenticular sheet are provided in this order from an incidence side of the illumination light;
the light reflection layer includes opening portions which are formed therein and arranged to correspond to unit lenses, respectively, and which are formed of material having a lower refractive index than that of the lens sheet; and
the adhesion layer or the adhesive layer is thinner than the light reflection layer.

66. The optical sheet according to claim 65, wherein:
the group of convex cylindrical lenses are arranged in parallel at the lens unit, and the lenticular sheet has the surface located opposite to the lens unit;
light reflection parts are provided at areas of the surface of the lenticular sheet, which are close to a focal point of the lens unit, and light transmission parts are provided at the other areas of the surface of the lenticular sheet; and
the light transmission parts have surfaces which are not flat, and in which convex or concave portions are formed.

67. The optical sheet according to claim 66, wherein at the light transmission parts, at least convex or concave cylindrical lenses are formed.

68. The optical sheet according to claim 65, wherein the lens sheet is a monolithic compact formed by press molding or extrusion molding using a thermoplastic resin.

69. The optical sheet according to claim 65, wherein each of the light reflection parts is formed by applying formation or transferring formation of an ink layer formed by dispersively mixing filler metal, or laminating formation of metallic foil.

70. The optical sheet according to claim 65, wherein the adhesion layer or the adhesive layer is any of ultraviolet curing resin layer, a pressure sensitive adhesive layer or a thermosensitive adhesive layer.

71. The optical sheet according to claim 65, wherein the adhesion layer or the adhesive layer contains light diffusion fine particles.

72. The optical sheet according to claim 65, wherein the light reflection layer is formed of any of white ink, metallic foil and a metallized layer.

73. The optical sheet according to claim 65, wherein the lens sheet is a monolithic compact formed by press molding or extrusion molding using a thermoplastic resin.

74. The optical sheet according to claim 65, wherein the lens sheet has a laminated structure in which the unit lenses are formed of hardened material of radiation hardening resin, and are polymerizing-adhered onto a surface of the optical sheet.

75. The optical sheet according to claim 65, further comprising a light diffusion layer which is formed of a sheet or film having light diffusion characteristics, on the emission surface side of the optical sheet.

76. The optical sheet according to claim 65, further comprising a reflective polarization split film on the emission surface side of the optical sheet.

77. An optical sheet for use in illumination light control in a backlight unit for a display, comprising:
a light diffusion layer which diffuses illumination light toward an emission surface side of the light diffusion layer, which is a non-incidence surface side thereof;
an adhesion layer or an adhesive layer;
a light reflection layer which is adhered to the light diffusion layer by the adhesion layer or the adhesive layer, which has a front surface extending along the emission surface side of the light diffusion layer, and having a high reflectivity with respect to the emission surface side of the light reflection layer, and which reflects the light diffused by the light diffusion layer toward the light diffusion layer; and
a lens sheet having a flat reverse surface fixed to the other surface of the light reflection layer, and a front surface on which a plurality of unit lenses are provided,
wherein:
the light diffusion layer, the adhesion layer or the adhesive layer, the light reflection layer and the lens sheet are provided in this order from an incidence side of the illumination light; and
the light reflection layer includes opening portions which are formed therein in positions corresponding to those of the unit lenses, respectively, and has no side robe.

78. A backlight unit for a display comprising at least a direct-type light source and the optical sheet according to claim 65, on a back surface of an image display element specifying a display image.

79. A backlight unit for a display comprising at least a surface light source and the optical sheet according to claim 65, on a back surface of an image display element specifying a display image, the surface light source comprising an edge-light type light source and a waveguide.

80. A display comprising:
an image display element which comprises a liquid crystal display element specifying a display image in accordance with transmission/prevention of light-transmittance in units of one pixel;
a light source which comprises a cold-cathode tube or an LED; and
the optical sheet according to claim 65.

81. An optical sheet for use in illumination light control in a backlight unit for a display, comprising:
a lens sheet including a lens unit comprising a group of convex cylindrical lenses which are arranged in parallel, the lens sheet having a surface located opposite to the lens unit,
wherein:
light reflection parts are provided at areas of the surface of the lens sheet, which are close to a focal point of the lens unit;
light transmission parts are provided at the other areas of the surface of the lens sheet; and
the light reflection parts are arranged in a stripe manner to correspond to unit lenses of the convex cylindrical lenses, and have convex portions at the surface located opposite to the lens unit.

82. The optical sheet according to claim 81, wherein the light transmission parts have surfaces which are not flat, and in which convex or concave portions are formed.

83. The optical sheet according to claim 82, wherein the light transmission parts contain at least convex or concave cylindrical lenses formed therein.

84. The optical sheet according to claim 81, wherein the lens sheet is a monolithic compact formed by press molding or extrusion molding using a thermoplastic resin.

85. The optical sheet according to claim 81, wherein the lens sheet has a laminated structure in which the lens unit is formed on both surfaces of a light-transmission base material formed in the shape of a sheet.

86. The optical sheet according to claim 81, wherein each of the light reflection parts is formed by applying formation or transferring formation of an ink layer formed by dispersively mixing filler metal, or laminating formation of metallic foil.

87. An optical sheet for use in illumination light control in a backlight unit for a display, comprising:
a light diffusion layer which diffuses illumination light toward an emission surface side of the light diffusion layer, which is a non-incidence surface side thereof;
an adhesion layer or an adhesive layer;
a light reflection layer which is adhered to the light diffusion layer by the adhesion layer or the adhesive layer, which has a front surface extending along the emission surface side of the light diffusion layer, and having a high reflectivity with respect to the emission surface side of the light reflection layer, and which reflects the light diffused by the light diffusion layer toward the light diffusion layer; and
a lens sheet including a lens unit having a flat reverse surface fixed to the other surface of the light reflection layer, and a front surface on which a group of convex cylindrical lenses are arranged in parallel, the lens sheet having a surface located opposite to the lens unit,
wherein:
the light diffusion layer, the adhesion layer or the adhesive layer, the light reflection layer and the lens sheet are provided in this order from an incidence side of the illumination light;
the light reflection layer is striped to have convex portions at the surface on the side opposite to the lens unit in positions corresponding to those of unit lenses of the convex cylindrical lenses, respectively;

the light reflection layer includes opening portions which are formed to correspond to the unit lenses, respectively; and the adhesion layer or the adhesive layer is thinner than the light reflection layer.

88. The optical sheet according to claim 87, wherein the adhesion layer or the adhesive layer is any of ultraviolet curing resin layer, a pressure sensitive adhesive layer and a thermosensitive adhesive layer.

89. The optical sheet according to claim 87, wherein the adhesion layer or the adhesive layer contains light diffusion fine particles.

90. The optical sheet according to claim 87, wherein the light reflection layer is formed of any of white ink, metallic foil and a metallized layer.

91. The optical sheet according to claim 87, wherein the lens sheet is a monolithic compact formed by press molding or extrusion molding using a thermoplastic resin.

92. The optical sheet according to claim 87, wherein the lens sheet has a laminated structure in which the unit lenses are formed of hardened material of radiation hardening resin, and are polymerizing-adhered onto a surface of a base material sheet.

93. The optical sheet according to claim 87, further comprising a light diffusion layer which is formed of a sheet or film having light diffusion characteristics, on the emission surface side of the optical sheet.

94. The optical sheet according to claim 87, further comprising a reflective polarization split film on the emission surface side of the optical sheet.

95. A backlight unit for a display comprising at least a direct-type light source and the optical sheet according to claim 87, on a back surface of an image display element specifying a display image.

96. A backlight unit for a display comprising at least a surface light source and the optical sheet according to claim 87, on a back surface of an image display element specifying a display image, the surface light source comprising an edge-light type light source and a waveguide.

97. A display comprising:

an image display element which comprises a liquid crystal display element specifying a display image in accordance with transmission/prevention of light-transmittance in units of one pixel;

a light source which comprises a cold-cathode tube or an LED; and the optical sheet according to claim 87.

* * * * *

UNITED STATES PATENT AND TRADEMARK OFFICE
CERTIFICATE OF CORRECTION

PATENT NO. : 7,553,059 B2  Page 1 of 1
APPLICATION NO. : 11/925160
DATED : June 30, 2009
INVENTOR(S) : Kenjiro Kuroda et al.

It is certified that error appears in the above-identified patent and that said Letters Patent is hereby corrected as shown below:

Column 16, Lines 28-34, change
"31. A display comprising:
an image display element which comprises a liquid crystal
    display element specifying a display image in accordance
    with transmission of light or shutting out of light
    in units of one pixel;
a light source which comprises a cold-cathode tube or an
    LED; and the optical sheet according to claim 19." to
--31. A display comprising:
an image display element which comprises a liquid crystal
    display element specifying a display image in accordance
    with transmission of light or shutting out of light
    in units of one pixel;
a light source which comprises a cold-cathode tube or an
    LED; and
the optical sheet according to claim 19.--.

Column 21, Line 27, change "sheet," to --sheet.--.

Signed and Sealed this

Twenty-seventh Day of October, 2009

David J. Kappos
*Director of the United States Patent and Trademark Office*